United States Patent [19]
Saito

[11] Patent Number: 6,111,214
[45] Date of Patent: Aug. 29, 2000

[54] LASER WELDING APPARATUS

[75] Inventor: Shigeki Saito, Shizuoka, Japan

[73] Assignee: Suzuki Motor Corporation, Hamamatsu, Japan

[21] Appl. No.: 09/411,234

[22] Filed: Oct. 4, 1999

[30] Foreign Application Priority Data

Oct. 12, 1998 [JP] Japan ................................. 10-289309

[51] Int. Cl.$^7$ ................................................. B23K 26/00
[52] U.S. Cl. .................................. 219/121.63; 219/121.6; 219/121.64; 219/121.82; 219/121.65; 219/121.72
[58] Field of Search ........................... 219/121.63, 121.6, 219/121.64, 121.82, 121.65, 121.72

[56] References Cited

U.S. PATENT DOCUMENTS

| | | |
|---|---|---|
| 4,127,761 | 11/1978 | Pauley et al. ..................... 219/121 L |
| 4,377,735 | 3/1983 | Minamida et al. ............... 219/121 LM |
| 4,798,931 | 1/1989 | Hess, III ............................. 219/121.64 |

*Primary Examiner*—Patrick Ryan
*Assistant Examiner*—M. Alexandra Elve
*Attorney, Agent, or Firm*—McGinn & Gibb, P.C.

[57] ABSTRACT

A laser welding apparatus 10 according to the present invention comprises: a laser output mechanism 1 for applying a welding laser beam from its output end to a welding position of an object to be welded; and a plurality of jet nozzles for blowing out a shield gas to the welding position for preventing oxidation of the welding position, wherein the jet nozzles are arranged at an identical angle interval on a single circumference H around the welding laser beam. This enables to perform welding into a sufficient depth and width.

18 Claims, 11 Drawing Sheets

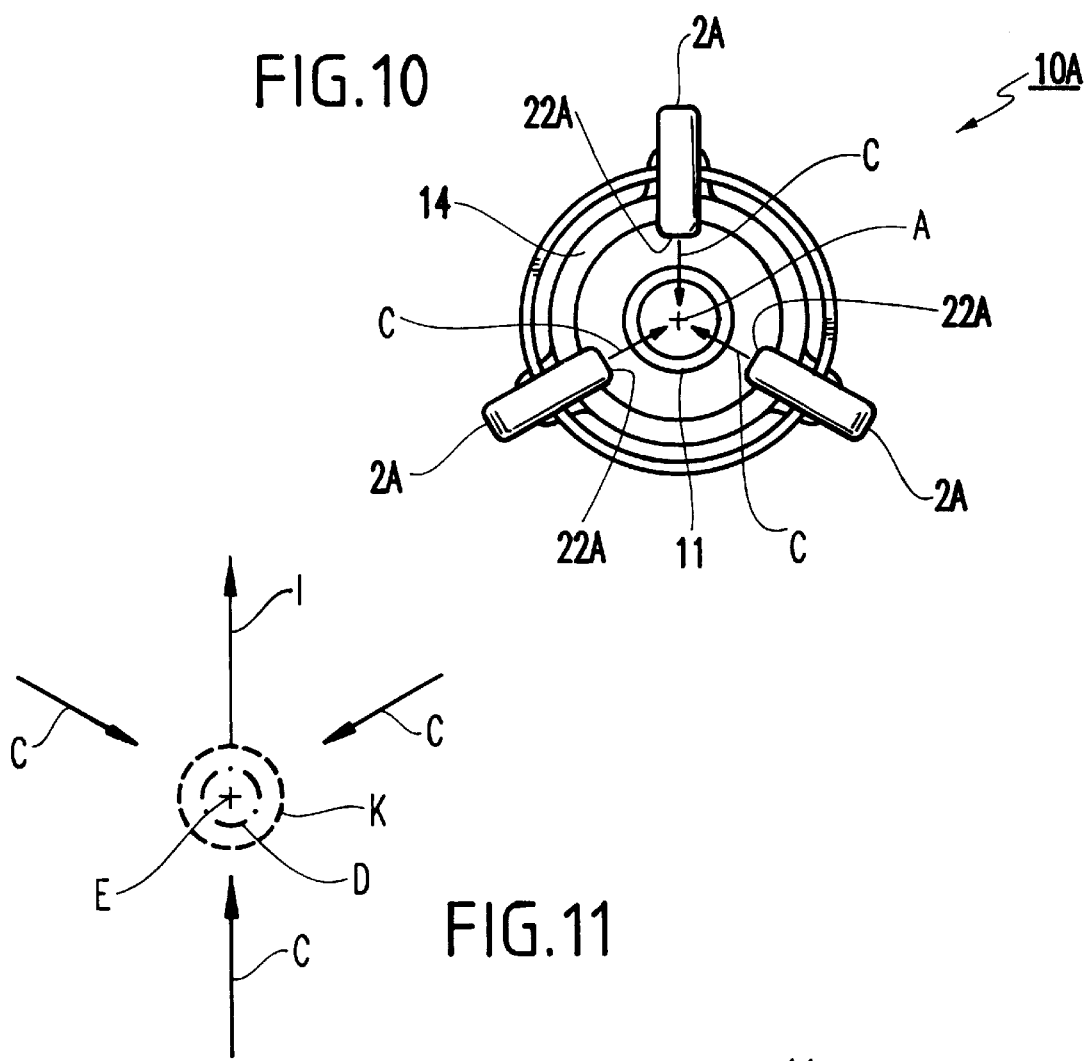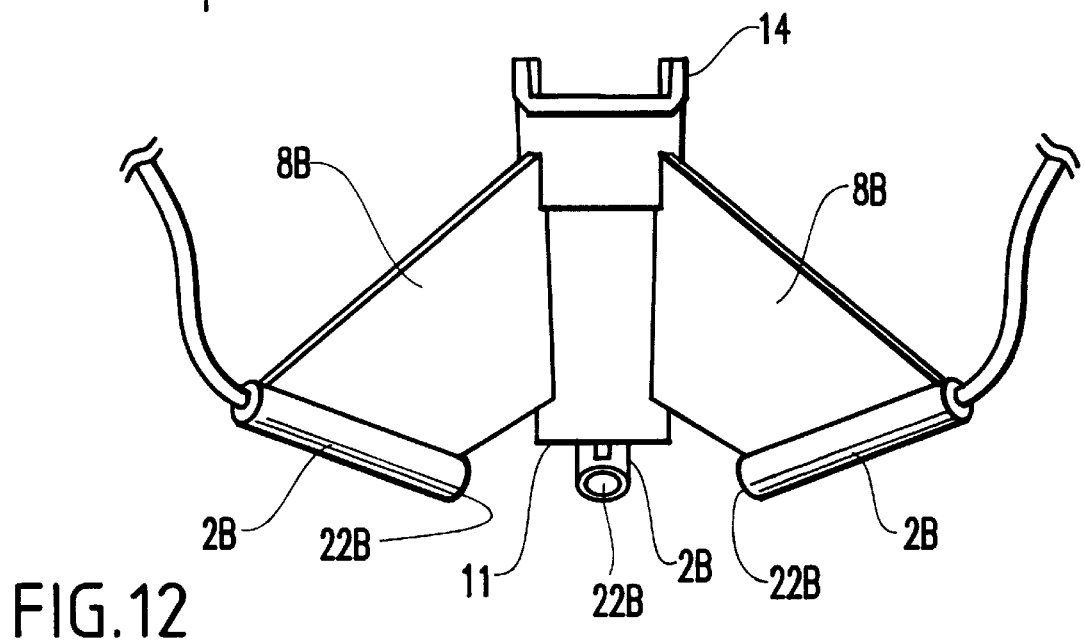

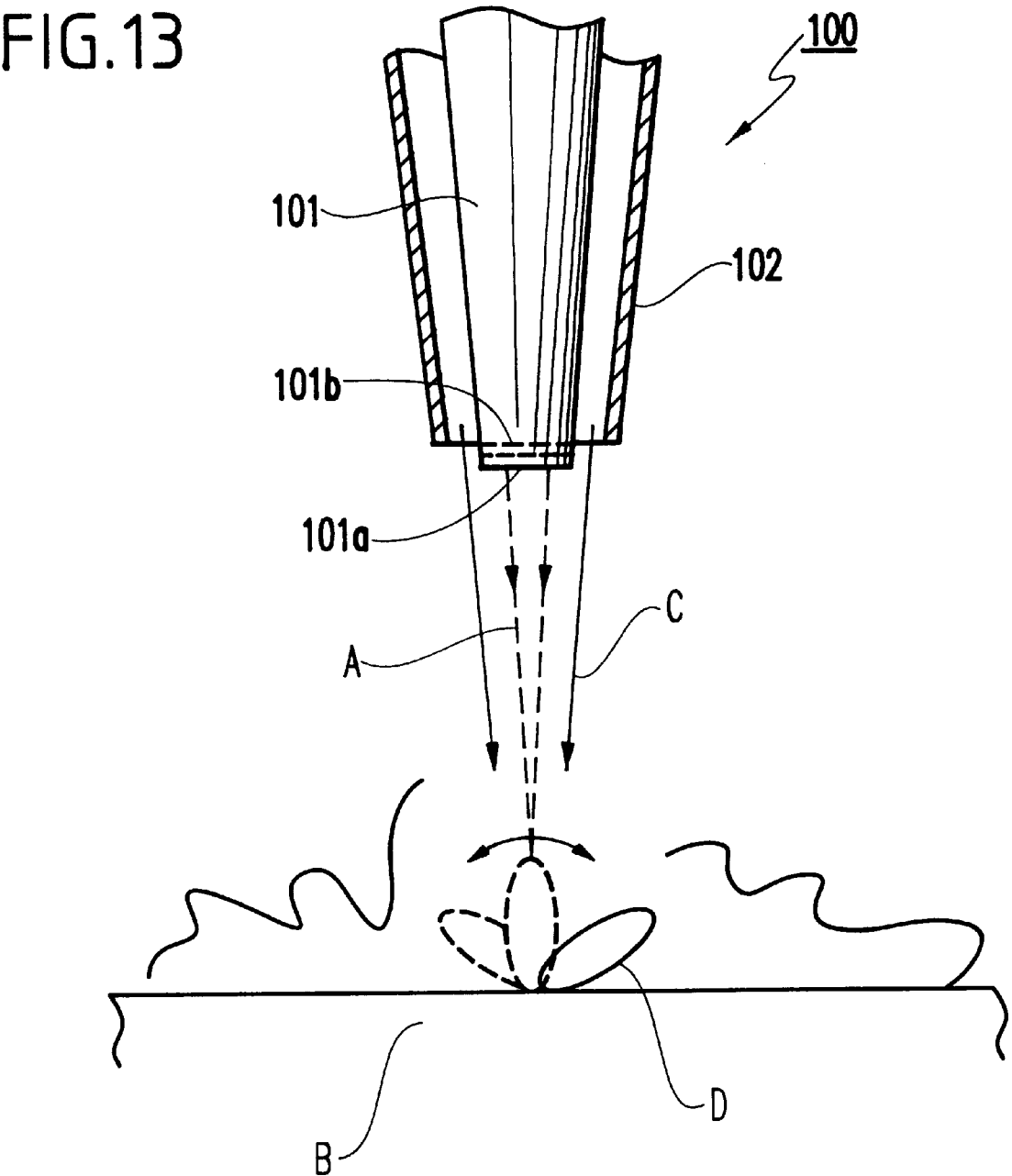

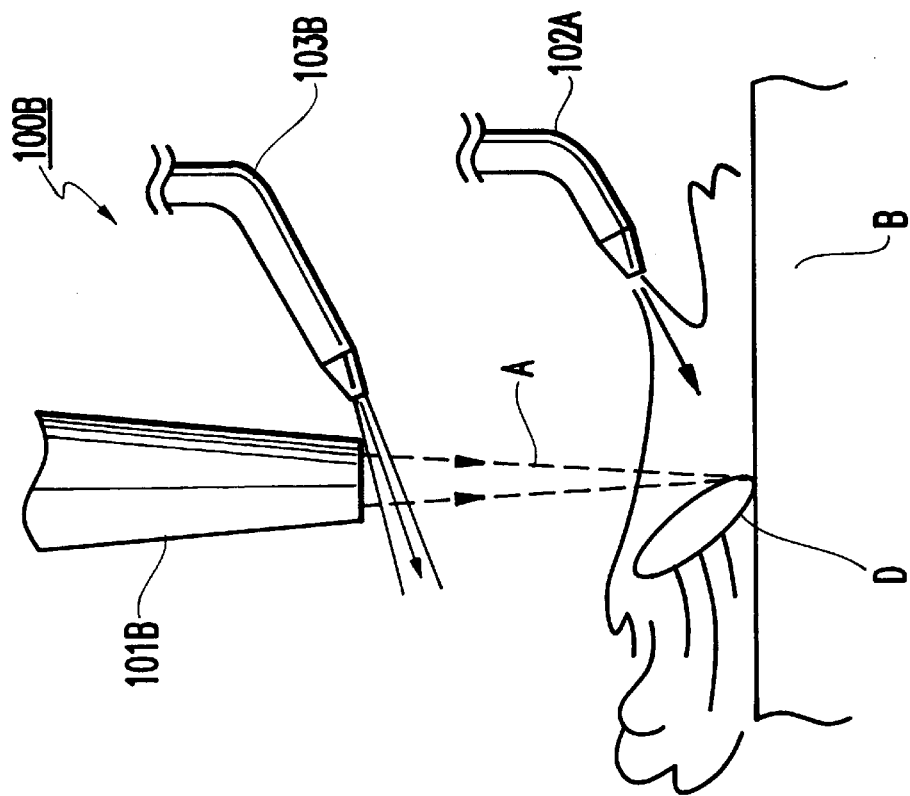
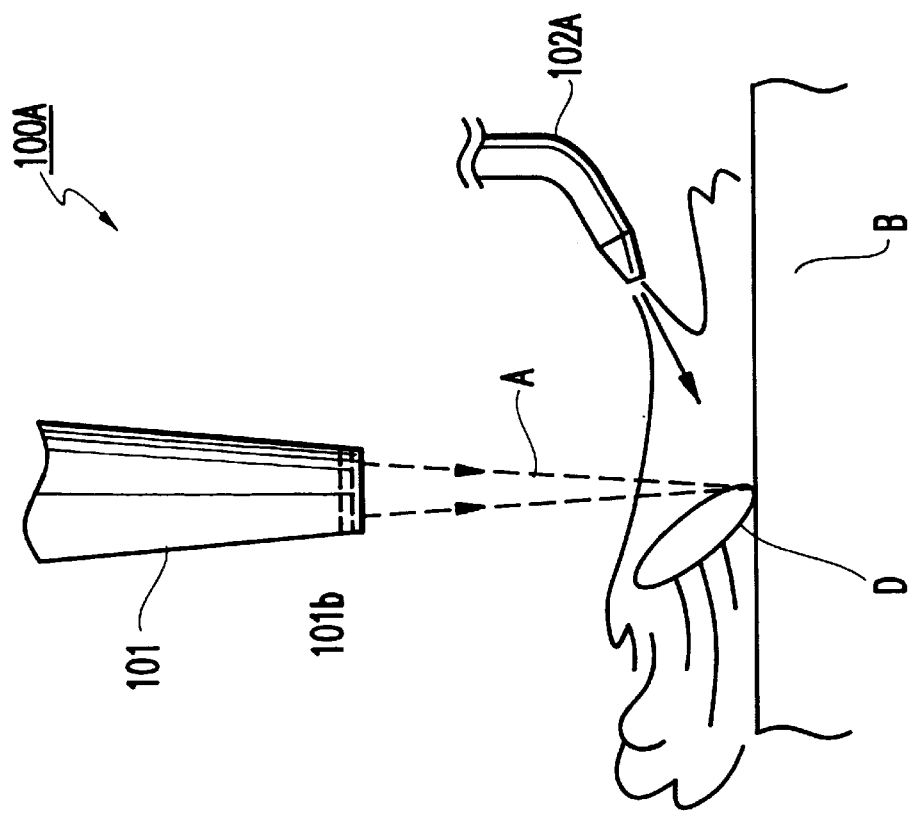

LASER WELDING APPARATUS

BACKGROUND OF THE INVENTION

1. Field of the Invention

The present invention relates to a laser welding apparatus and in particular, to a laser welding apparatus for welding in a shield gas atmosphere.

2. Description of the Related Art

FIG. 13 shows a conventional laser welding apparatus 100. The laser welding apparatus 100 includes a laser output mechanism 101 for emitting a welding laser beam A from its output end 101a. This laser output mechanism 101 has an optical system (not depicted) for setting a focal point of the welding laser beam A in the laser emission direction. The reference symbol 101b denotes a transparent protection plate for protecting the optical system from sputter during welding.

Furthermore, this laser welding apparatus 100 includes a jet unit 102 for spraying in jet a shield gas C for preventing oxidization of an object to be welded B during welding. This gas jet unit 102 is a cylindrical member having a laser output mechanism 101 inserted therein. The shield gas C is sprayed passing through a space between the inner wall of the gas jet unit 102 and the laser output mechanism 101 in the direction identical to the laser beam A emission.

When the laser welding apparatus 100 having the aforementioned configuration applies the welding laser beam A to an object B to be welded, a metal plasma D is generated. Simultaneously with this, the shield gas C is sprayed in jet so that welding of the object B is performed isolated from the oxygen of the atmosphere.

FIG. 14 shows another conventional laser welding apparatus 100A. This laser welding apparatus 100A, instead of the cylindrical gas jet unit 102, includes a jet nozzle 102A for spraying the shield gas C in one direction toward the welding position. The shield gas C is applied in jet almost in a vertical direction with respect to the laser beam A emission.

FIG. 15 shows still another conventional laser welding apparatus 100B. In comparison to the laser welding apparatus 100A, this laser welding apparatus 100B includes: a laser output mechanism 101B not having the protection plate 101b; and an air nozzle 103B for spraying a compressed air toward the output tip of the laser output mechanism 101B. This air nozzle 103B protects the output end of the laser output mechanism 101B from sputter.

However, in the aforementioned conventional laser welding apparatuses, the shield gas C is blown so as to blow off the metal plasma D generated during laser welding, from the welding position. No consideration has been taken on the affect to the welding range.

That is, in the laser welding apparatus 100, the welding laser beam A is applied together with the shield gas C, and the metal plasma D generated in the welding position is disturbed as shown in FIG. 13. Moreover, in the other laser welding apparatuses, the shield gas C is applied from one direction, and accordingly, the metal plasma D is pushed toward the downstream and cannot be stay at the welding position.

Here, explanation will be given on the relationship between the metal plasma and the laser welding. Conventionally, it has been considered that the plasma generated during laser welding lowers transmittance of the welding laser beam, preventing effective transmittance of laser energy to an object to be welded. However, it has been observed as test results that when the metal plasma is moved by the shield gas, the melting capability of the metal to be welded is lowered.

FIG. 16 and FIG. 17 show experimental data, i.e., the difference between melting amount when the shield gas is supplied and when not supplied. In the experiment, a metal sample made from aluminum was subjected to the welding laser beam while fluctuating an energy density per a unit welding length with and without shield gas blowing. The width and depth of the melting were measured. Here, the shield gas was blown from the same direction as the aforementioned conventional laser welding apparatus 100. The amount of the shield gas was 20 litters and the nozzle diameter was 5 mm.

FIG. 16 has a horizontal axis indicating an energy density per a unit welding length and a vertical axis showing the welding depth change caused by the energy density change.

FIG. 17 has a horizontal axis indicating an energy density per a unit welding length and a vertical axis showing the welding range (width) change caused by the energy density change.

In both of FIG. 16 and FIG. 17, the solid line indicates the value obtained when the shield gas was used and the broken line shows values obtained when no shield gas was used.

FIG. 16 shows that the melting depth is increased when no shield gas is supplied. FIG. 17 shows that the melting width is slightly increased when no shield gas is supplied.

Thus, in the conventional examples, the metal plasma growth is deteriorated, disabling to obtain a sufficient welding depth and width and sufficient welding strength.

SUMMARY OF THE INVENTION

It is therefore an object of the present invention to provide a laser welding apparatus capable of performing a sufficiently deep and wide welding even if a sufficient shield gas is supplied.

The laser welding apparatus according to the present invention comprises: a laser output mechanism for applying a welding laser beam from its output end to a welding position of an object to be welded; and a plurality of jet nozzles for blowing out a shield gas to the welding position for preventing oxidation of the welding position, wherein the jet nozzles are arranged at an identical angle interval on a single circumference around the welding laser beam.

With this configuration, welding is performed by emitting a welding laser beam toward the focal point of the laser output mechanism and simultaneously with this, a shield gas is blown toward the welding position. Here, the jet nozzles are arranged at an identical angle interval on a single circumference around the welding laser beam. That is, the welding position is subjected to an identical wind blast from different directions and the wind blast is cancelled by one another. Accordingly, welding can be performed with a stable metal plasma.

According to another aspect of the present invention, each of the jet nozzles is set to blow out direction at an intersecting angle of 70 to 90 degrees with respect to the welding laser beam emission direction.

According to still another aspect of the present invention, the apparatus further comprises a jet direction adjustment mechanism for adjusting the intersecting angle defined by the welding laser beam emission direction and the jet nozzle blow out direction.

By using this jet direction adjustment mechanism, the jet nozzles can be adjusted so as to obtain a stable metal plasma.

According to yet another aspect of the present invention, the laser welding apparatus further comprises a laser support mechanism for supporting the laser output mechanism and moving the laser output mechanism toward or away from the object to be welded, wherein the jet direction adjustment mechanism support the jet nozzles movably reciprocally along the same direction as the laser support mechanism.

With this configuration, the laser support mechanism enables to adjust the position of the focal point in the depth direction of the welding position according to the thickness of the object to be welded. Simultaneously with this, the fluctuation of the distance from the jet nozzles to the welding position can be adjusted by the jet direction adjustment mechanism.

BRIEF DESCRIPTION OF THE DRAWINGS

FIG. 10 is a bottom view of the laser welding apparatus shown in FIG. 9.

FIG. 11 shows shield gas blow out directions from jet nozzles and affect on the metal plasma.

FIG. 12 shows another example of jet nozzles and their arrangement.

FIG. 13 shows a conventional welding apparatus.

FIG. 14 shows another conventional welding apparatus.

FIG. 15 shows still another conventional welding apparatus.

DESCRIPTION OF THE PREFERRED EMBODIMENTS

Description will now be directed to a laser welding apparatus according to a first embodiment of the present invention with reference to FIG. 1 to FIG. 8.

Figure 1:
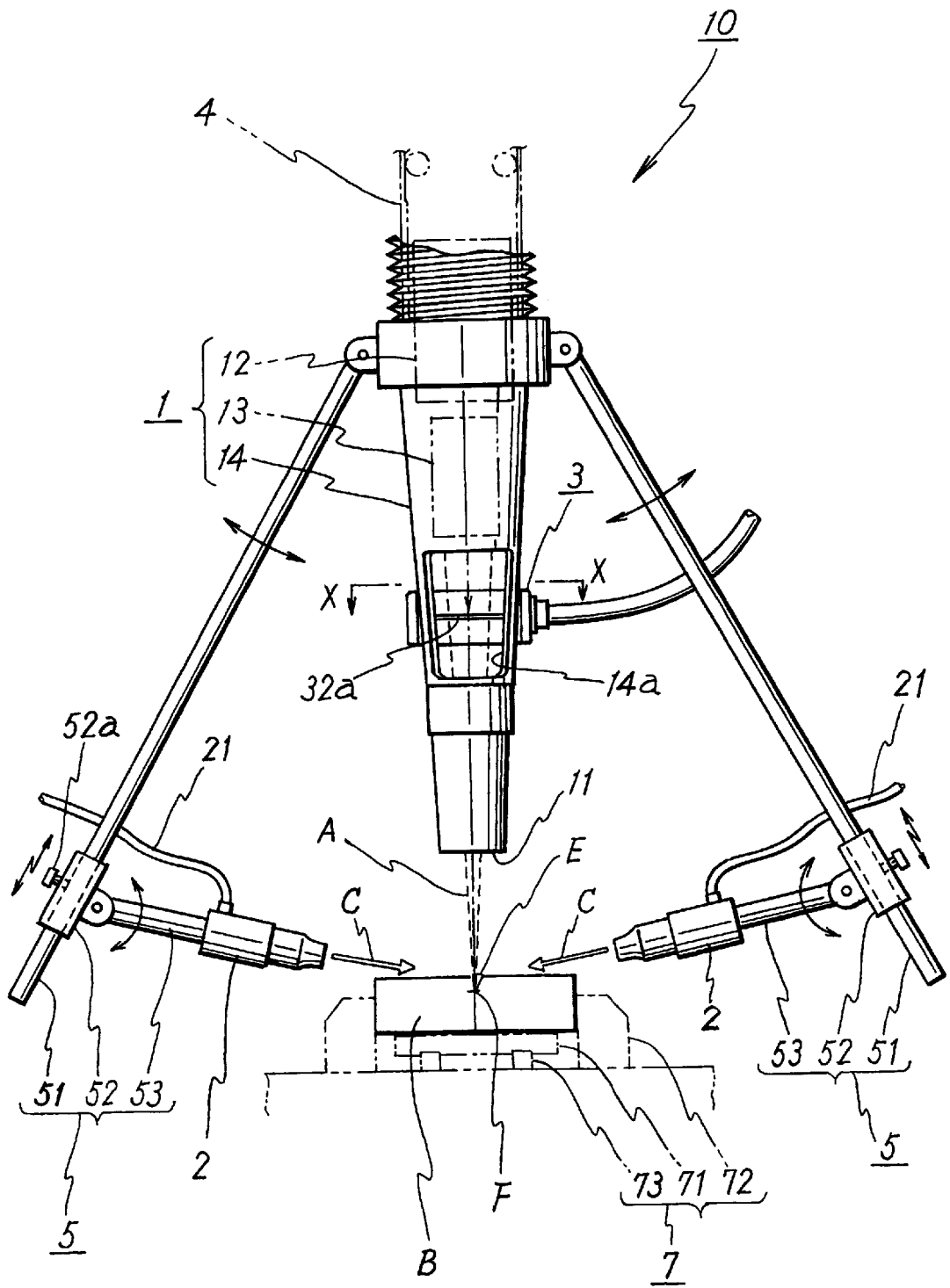
FIG. 1 is a front view (partially omitted) of a laser welding apparatus according to a first embodiment of the present invention.

As shown in FIG. 1, this laser welding apparatus 10 according to the first embodiment includes a laser output mechanism 11 for emitting from its output end 11 a welding laser beam A to a welding position E of an object B to be welded. The welding laser beam A is focused at point F.

Furthermore, the laser welding apparatus 10 includes two jet nozzles 2 for emitting a shield gas C for protecting the object E to be welded from oxidization; and a travelling stage 7 for maintaining the object B and feeding the object B in the direction along the welding position E.

The laser welding apparatus 1 includes: a laser oscillator 12; a beam converging optical system for focusing the welding laser beam A at the focal point F; and a cylindrical frame 14 containing the laser oscillator 12 and the beam converging optical system 13. The welding laser beam A is a YAG laser. Normally, the focal point F of the welding laser beam A is set in the vicinity of the welding position E.

The cylindrical frame 14 is tapered, decreasing its diameter downward. The welding laser beam A is emitted from the output end 11 at the lower end. Two windows 14a, 14a as cut-off portions are provided in the cylindrical frame 14 between the output end 11 and the beam converging optical system 13. These windows oppose to each other sandwiching the center axis of the cylindrical frame 14.

Figure 2:
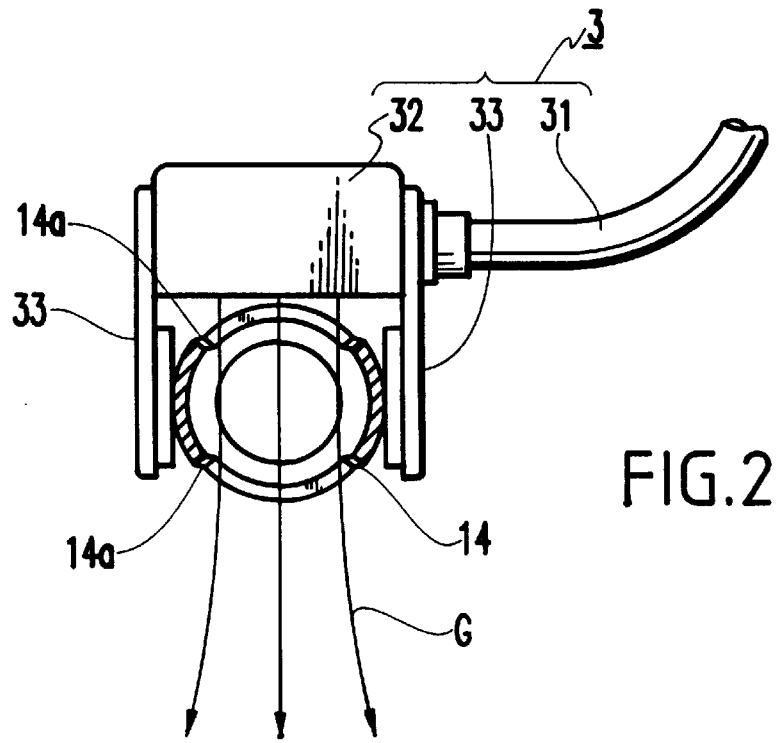
FIG. 2 is a cross sectional view of a part of the first embodiment at line X—X in FIG. 1.

One of the windows 14a includes an optical system protection unit 3. As shown in FIG. 2, this optical system protection unit 3 includes: an air nozzle 32 having a slit-shaped blow out exit 32a for blowing out a compressed air through a tube 31; a mounting unit for mounting the air nozzle 32 with its blow out exit 32a arranged in the vicinity of one of the windows 14a.

The blow out exit 32a of the air nozzle 32 has a horizontal slit shape having a width of 0.5 mm. The compressed air G blown out from here advances in the horizontal direction through the two windows. Here, the compressed air G serves as a film-shaped air curtain to shut off external dust such as sputter from the welding position and protect the beam converging optical system 13.

On the top of the cylindrical frame 14, there is provided a bellows-shaped cover 15. Inside this cover 15, there is provided a laser support mechanism 4 for moving the laser output mechanism 4 toward and away from the object B to be welded (upward and downward in FIG. 1). More specifically, the laser support mechanism 4 is constituted by a rack-pinion mechanism and a ball-bearing screw for urging reciprocal movement.

With this laser support mechanism 4, the laser output mechanism 1 can be raised or lowered to adjust the position of the focal point F. That is, it is possible to adjust the focal point at a preferable depth, according to the material and thickness of the object B to be welded.

Next, explanation will be given on two jet nozzles 2. These jet nozzles 2 are supplied via hoses 21 with a shield gas C having identical compression, so that the shield gas C is blown out from the blow out exits 22 toward the object E to be welded.

Figure 3:
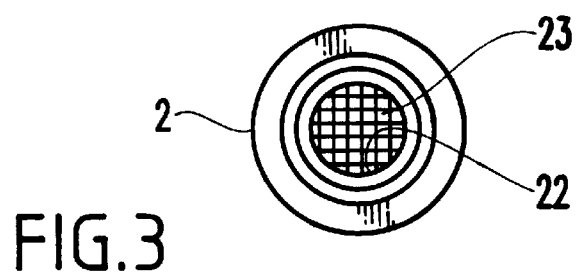
FIG. 3 is a jet nozzle viewed from the blow out side.

As shown in FIG. 3, each of the blow out exits 22 has a circular shape having a current plate 13 made from thin plates combined into a grid.

Figure 4:
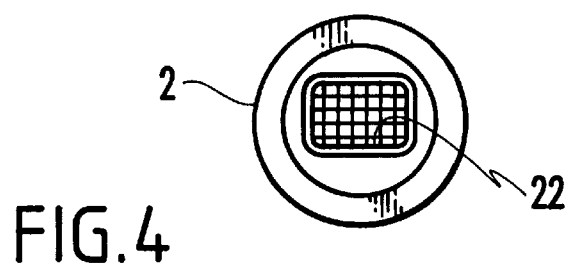
FIG. 4 shows another example of the jet nozzle viewed from the blow out side.

This blow out exit 22 may not be circular but rectangular as shown in FIG. 4.

Moreover, the shield gas C may be nitrogen, argon gas, helium gas or other inert gas.

Figure 5:
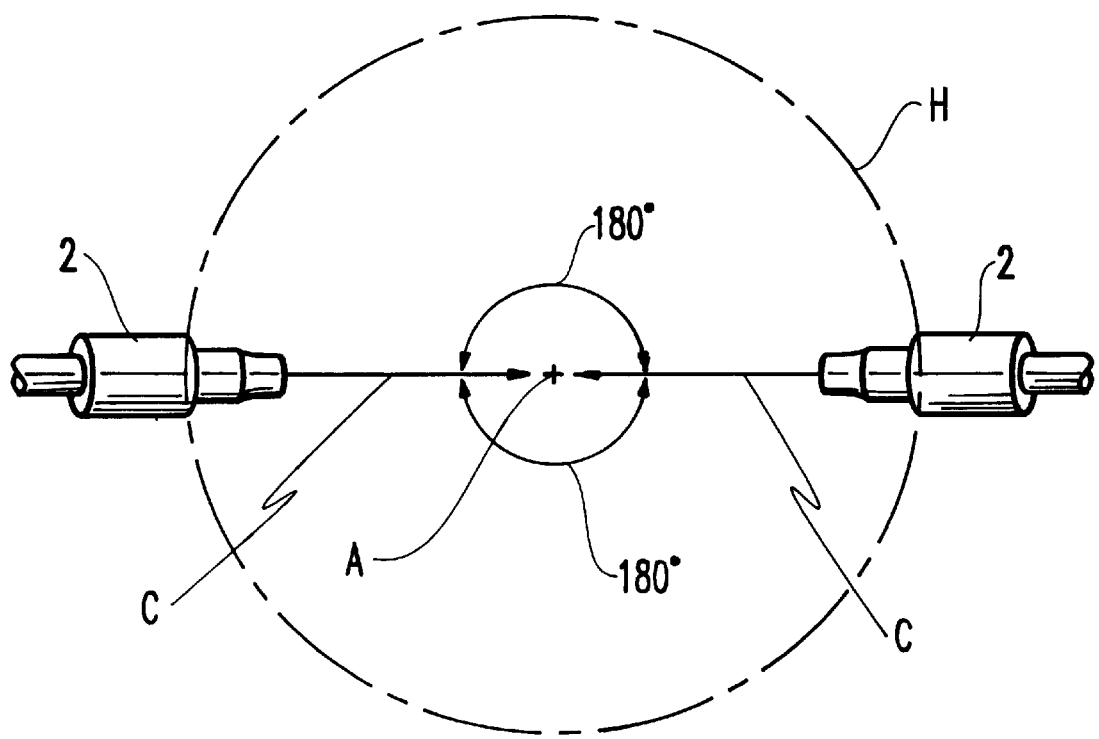
FIG. 5 shows an arrangement of two jet nozzles.

The jet nozzles 2 are respectively supported by two jet direction adjustment mechanisms 5. As shown in FIG. 5, the jet direction adjustment mechanism 5 can arrange the jet nozzles 2 on a circle around the welding laser beam A as a center, at an angle of 180 degrees (i.e., 360 degrees divided by 2).

Similarly as the jet nozzles 2, the aforementioned jet direction adjustment mechanisms 5 are also arranged on a circle around the welding laser beam A as a center, at an angle of 180 degrees to each other. That is, each of the jet direction adjustment mechanisms 5 includes: a long arm 51 of a round bar shape whose upper end is rotatably attached to the cylindrical frame; a link member 52 engaged with the long arm 51 in such a manner that the link member can slide along the long arm 51; and short arm 53 rotatably attached to the link member 52, wherein the rotation axis of the long arm 51 is parallel to the rotation axis of the short arm.

The long arms are arranged symmetrically with respect to the emission direction of the welding laser beam A and attached to the upper portion of the cylindrical frame 14, and their rotation axes are arranged horizontally (i.e., vertical to the paper surface). Each of the long arms 51 rotate in the vertical plane (i.e., the paper surface) including the trace of the welding laser beam A. It should be noted that a rotation shaft of the long arm 51 is surrounded by a rubber or other elastic member for causing friction between the long arm 51 and the cylindrical frame 14, so that the rotation is not caused without applying a predetermined external force.

The long arm is inserted into the aforementioned link member 52 having a cylindrical shape. The link member has a tightening bolt 52a for fixing the link to a selected position of the long arm 51. This tightening bolt 52a is engaged in a guide groove (not depicted) formed in the longitudinal direction of the long arm. This prevents rotation of the link member 52 around the long arm 51.

The short arm 53 has one end connected to the link member 52 through a rotary shaft arranged in parallel to the rotary shaft of the long arm 51. The other end of the short arm 53 has jet nozzle 2 for blowing out the shield gas C in the longitudinal direction of the short arm 53.

The jet direction adjustment mechanism 5 having the aforementioned configuration can set the jet nozzle 2 at any position within a range of the long arm 51 plus the short arm 53, on a single plane containing the trace of the welding laser beam A. The jet nozzles 2 can be set at any direction on the single plane.

Accordingly, the jet direction adjustment mechanism 5 can move the jet nozzles 2 reciprocally in the same direction of the reciprocal movement of the laser output mechanism 1 by the laser support mechanism 4.

Next, the traveling stage 7 includes a table 71 on which an object B to be welded is placed. The table 71 has a fixing unit having a vice configuration. The table 71 is held on guide rails 73 for feeding the object B along the welding position E. That is, the table 71 is movably engaged with the guide rails 73. Also, a travel urging unit (not depicted) is provided for moving the table 71. Thus, the object B to be welded is fed at a constant speed along the welding position E. It should be noted that the object B to be welded is fixed on the table 71 so that the feed direction is matched with the welding position E.

Figure 6:
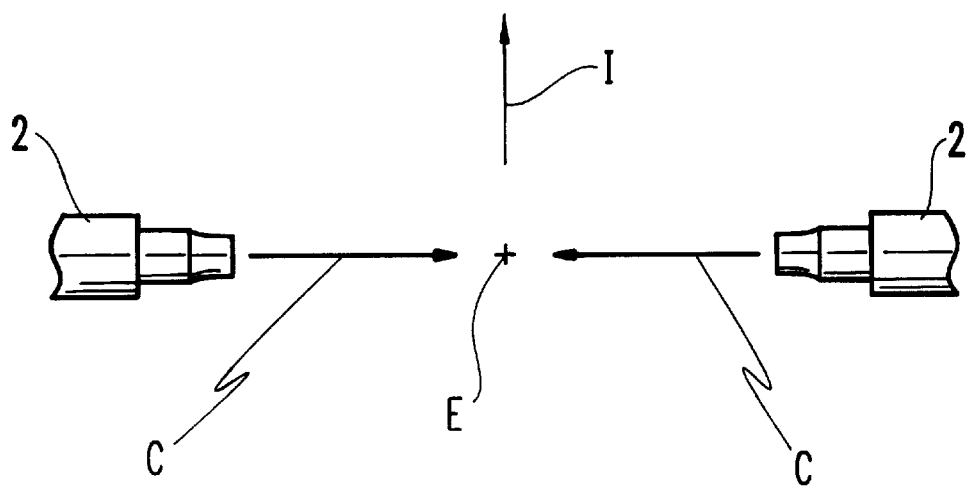
FIG. 6 shows a relationship between the blow out directions of the shield gas from the jet nozzles and a feed direction of the object to be welded.

As shown in FIG. 6, it is preferable that the feed direction I of the object B to be welded on the traveling stage 7 vertically intersect the line connecting the jet nozzles 2 supported by the jet direction adjustment mechanisms 5. The jet direction adjustment mechanisms are symmetrically arranged with respect to the feed direction.

Explanation will now be given on the operation of the laser welding apparatus 10 having the aforementioned configuration. In the laser welding apparatus 10, prior to the welding of the object B, the laser support mechanism 4 sets the focal point F and each of the jet direction adjustment mechanisms 5 sets the position and jet directions of the jet nozzle.

Firstly, the laser output mechanism 1 is raised or lowered by the laser support mechanism 4 so as to set the focal point F according to the thickness and material of the object B to be welded.

Figure 7:
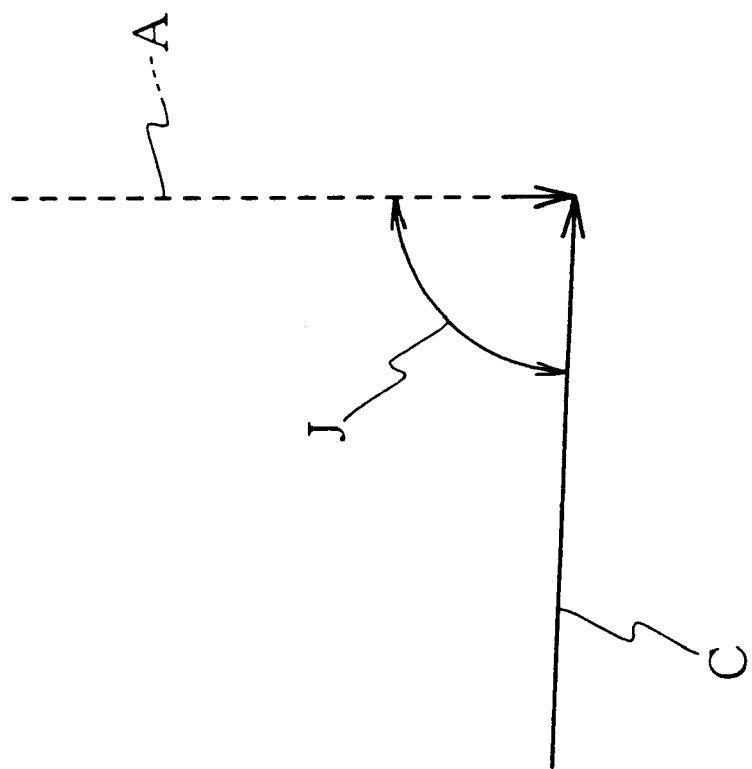
FIG. 7 shows a relationship between the shield gas blow out direction from the jet nozzles and the welding laser beam emission direction.

Moreover, in the jet direction adjustment mechanisms 5 maintain the jet nozzles 2 symmetrically with respect to the trace of the welding laser beam A and slightly higher (upper in FIG. 1) than the welding position E. Here, each of the jet direction adjustment mechanisms has identical rotation angle of the long arm 51 and the short arm 53 and the identical arrangement of the link member 52, so that the jet direction of the jet nozzles intersect the welding laser beam direction at an identical angle J (FIG. 7). This angle J is preferably in the range from 60 to 90 degrees, and more preferably from 70 to 90 degrees. Thus, the jet nozzles are directed to the welding position E.

After setting of the jet nozzles is complete, the shield gas C is blown to the welding position E. The optical system protection unit starts blowing of the compressed air G, and then emission of the welding laser beam A is started and the feed of the object B to be welded on the traveling stage is started. When the welding position is entirely welded, the emission of the welding laser beam A and the blow off of the shield gas C are terminated, thus completing the welding operation.

Figure 8:
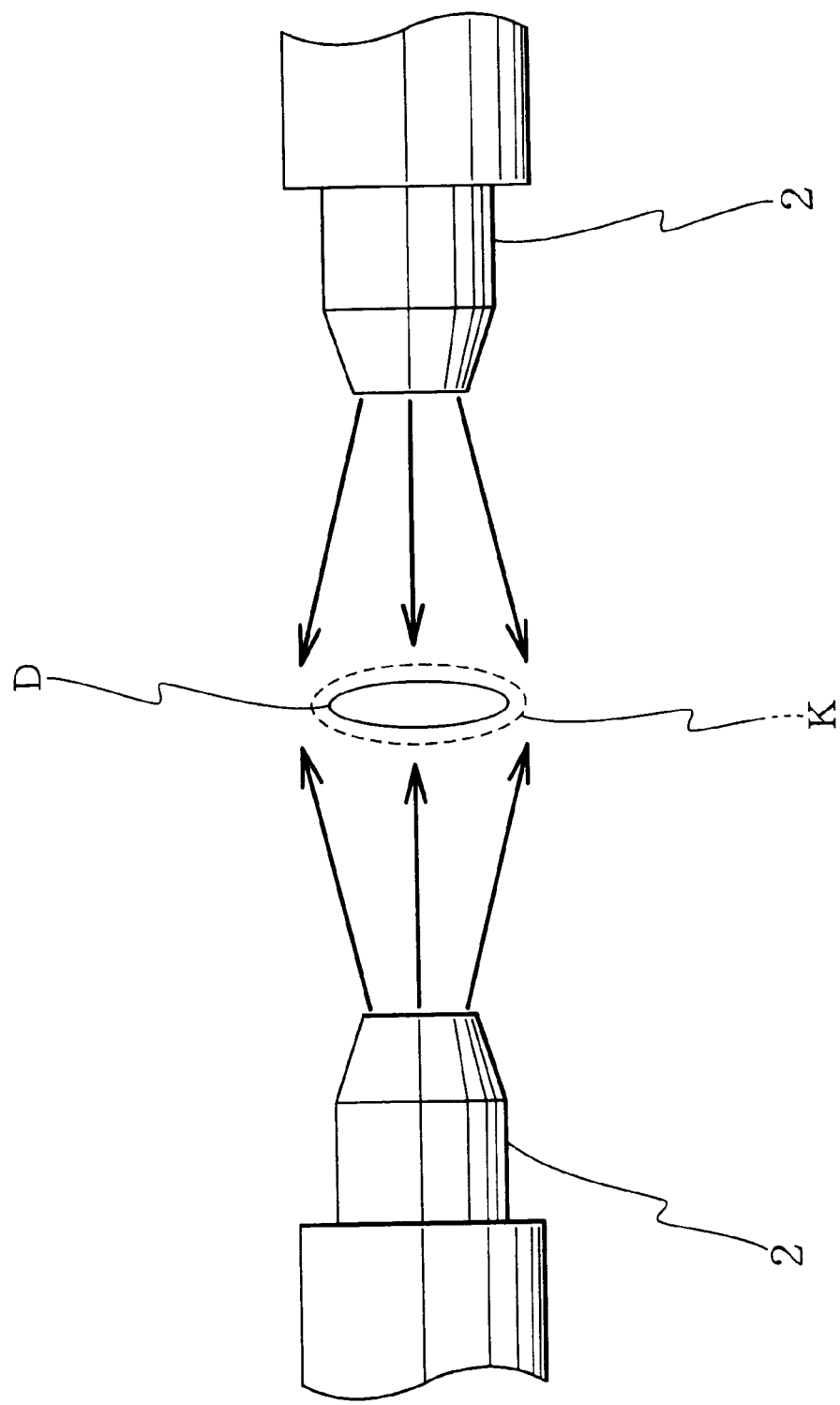
FIG. 8 shows shield gas blow out direction from the jet nozzles and the metal plasma affected by shield gas.

Since the jet nozzles 2 are arranged at an identical angle on the circumference H around the welding laser beam A (FIG. 5), shield gas blown out from these positions generates identical wind blast onto the during the welding as shown in FIG. 8. The wind blast in both directions are compensated, and a static pressure region K is formed at the welding position E. Moreover, the welding laser beam A generates a metal plasma D in this static pressure region. The metal plasma D can be welded in a stable condition.

Accordingly, in the laser welding apparatus 10, during welding, it is possible to promote the stable growth of the metal plasma D, assuring a sufficient welding depth and width. This increases the welding intensity.

Moreover, in the laser welding apparatus 10, according to the focal point adjustment of the laser support mechanism 4, the jet direction adjustment mechanisms 5 can set the position and direction of the jet nozzles 2. Accordingly, it is possible to blow the shield gas C in a preferable state for various types of materials or thickness of the object B to be welded. This enables to increase the welding intensity.

Figure 9:
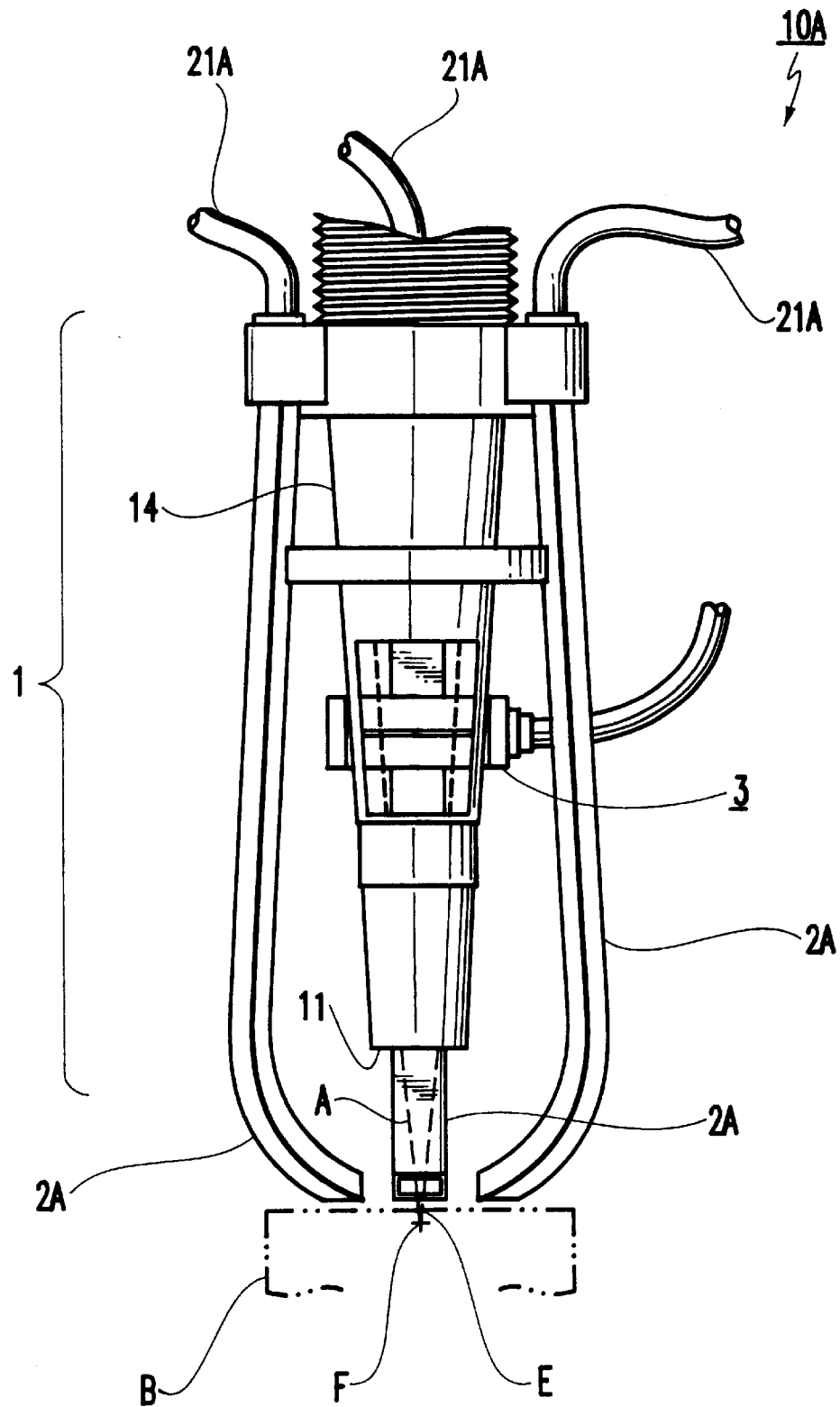
FIG. 9 shows front view (partially omitted) of a laser welding apparatus according to a second embodiment of the present invention.
Figure 16:
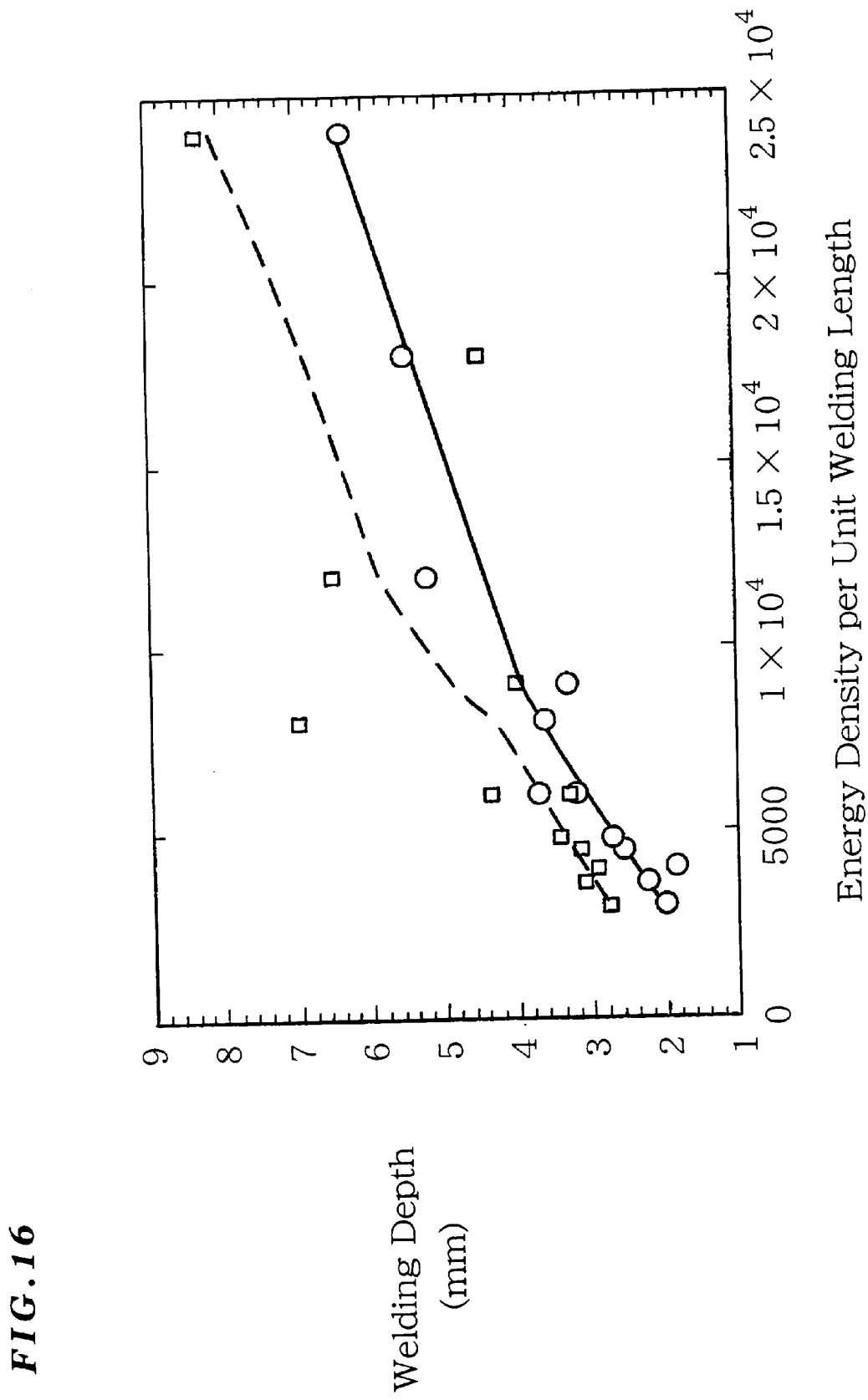
FIG. 16 shows welding depth in a sample metal piece when shield gas is supplied and when not supplied.
Figure 17:
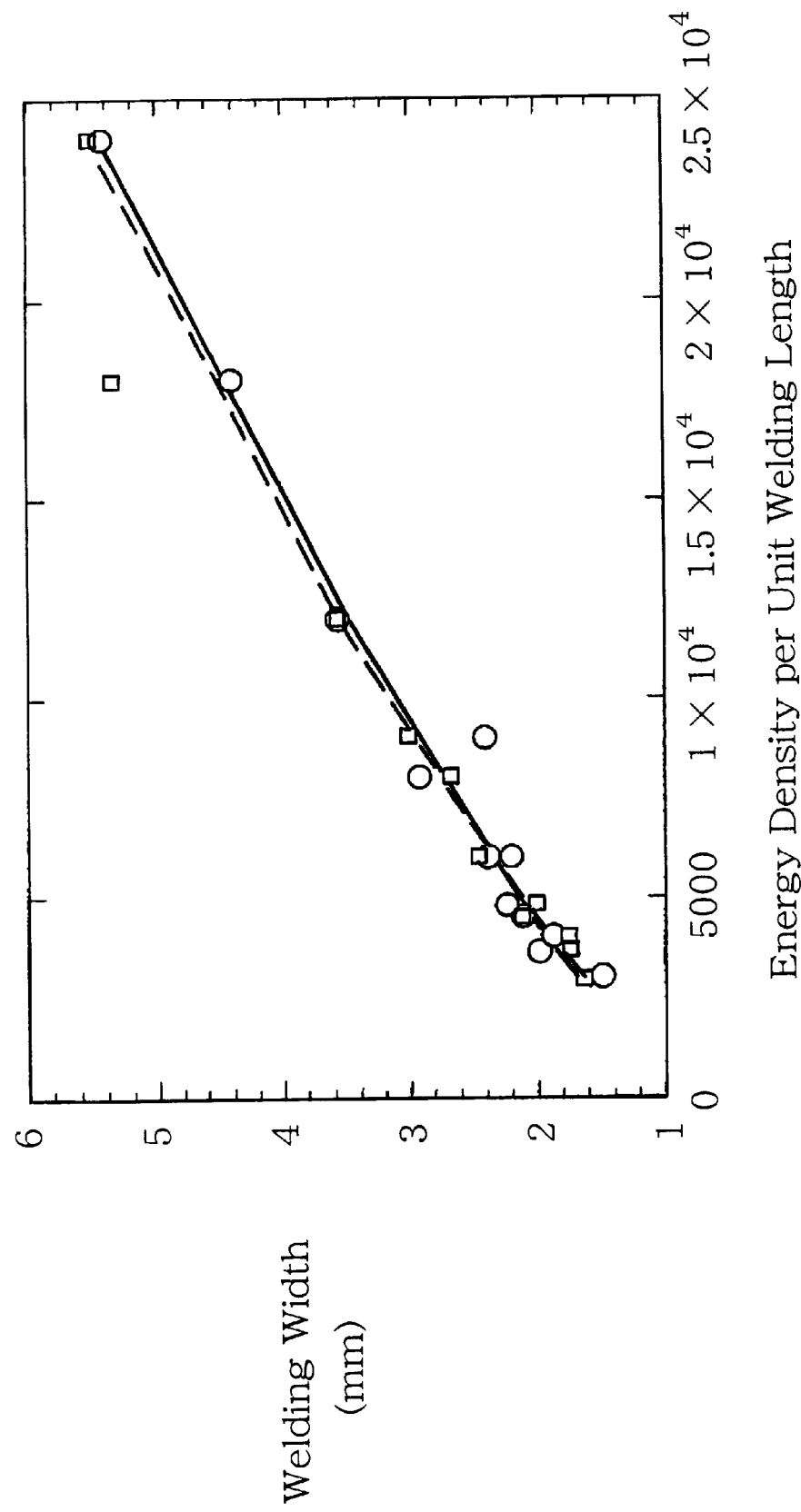
FIG. 17 shows welding area in a sample metal piece when shield gas is supplied and when not supplied.

Description will now be directed to a laser welding apparatus 10A according to a second embodiment of the present invention. As shown in FIG. 9, the second embodiment employs three of the jet nozzles 2A. Explanation will be given only on a different configuration from the first embodiment, and like components will be denoted by like reference symbols.

In this laser welding apparatus 10A, the jet nozzles 2A are fixed directly to the cylindrical frame without having the jet direction adjustment mechanisms 5. That is, the jet nozzles 2A are hollow pipes having one end fixed to the top of the cylindrical frame 14 and connected to a hose 21A for supplying a shield gas under identical constant pressure.

The other ends of the jet nozzles 2A extend to the vicinity of the welding position E and have a blow out exit 22A for the shield gas C.

FIG. 10 is a bottom view of the laser welding apparatus 10A viewed from the bottom of FIG. 9. FIG. 10 omits the window 14a of the cylindrical frame 14 and the optical system protection unit 3. As shown in FIG. 10, the jet nozzles 2A are arranged at an identical angle (120 degrees). Each nozzle has its blow out exit 22A directed in radial direction, and has identical distance to from the blow out exit 22A to the welding laser beam A.

Moreover, the blow out direction of each of the jet nozzles 22A is set at 80 degrees (J in FIG. 7) with respect to the beam emission direction of the welding laser beam A. This angle J may be set to other values if in a range from 70 to 90 degrees.

As shown in FIG. 11, in the laser welding apparatus 10A, the jet nozzles 2a are arranged at an identical angle interval on the circumference H around the welding laser beam A. When the shield gas C is simultaneously blown from these positions, the welding position E is subjected uniform wind blast and all the wind blasts are compensated to form a static region K at the welding position. The metal plasma D generated in this static region can perform stable welding.

Like the laser welding apparatus 10, the laser welding apparatus 10A promotes a stable growth of the metal plasma D, assuring a sufficient welding depth and width. This enables to increase the welding intensity.

Here, the jet nozzles 2A may not extend from the top of the cylindrical frame 14. For example, as shown in FIG. 12, it is possible to provide three fixing units 8B of bracket type in the vicinity of the output end 11 of the cylindrical frame 14, so as to be radial at an identical angle interval. The jet nozzles 2B of a straight cylindrical form are mounted on the tip end of the three fixing units 8B. Here, the direction of the jet nozzles 2 and the position of the blow out exit 22B are preferably set in the same way as the aforementioned jet nozzles 2A and the blow out exits 22A.

With this configuration also, it is possible to increase the effect in the same way as the arrangement of the jet nozzles 2A. The jet nozzles 2B can be made shorter than the jet nozzles 2A. This increases the rigidity, suppressing deflection of the jet nozzles 2B during blow out of the shield gas, thus increasing the welding intensity with a higher reliability.

According to the present invention, a plurality of jet nozzles are arranged at an identical angle interval on a single circumference. During a welding operation, the shield gas is blown off simultaneously from the jet nozzles thus arranged. That is, the welding position is subjected to identical wind blasts from different directions which are cancelled by one another, forming a static pressure region at the welding position. The metal plasma is generated in this static pressure region and welding can be performed with the metal plasma in a stable state.

The present invention promotes a stable growth of the metal plasma, assuring a sufficient welding depth and welding width, enabling to increase the welding intensity.

Moreover, in the configuration having the jet direction adjustment mechanisms, according to the focal point adjustment by the laser support mechanism, each of the jet nozzles can be adjusted in position and direction, so that the shield gas is appropriately applied according to the material or thickness of the object to be welded. This increases the welding intensity.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-289309 (Filed on Oct. 12$^{th}$, 1998) including specification, claims, drawings and summary are incorporated herein by reference in its entirety.

What is claimed is:

1. A laser welding apparatus comprising:
    a laser output mechanism for applying a welding laser beam from its output end to a welding position of an object to be welded; and
    a plurality of jet nozzles for blowing out a shield gas to the welding position for preventing oxidation of the welding position, wherein the jet nozzles are symmetrically arranged around a circumference provided about the welding laser beam at the welding position.

2. A laser welding apparatus as claimed in claim 1, wherein the plurality of jet nozzles comprises three jet nozzles.

3. A laser welding apparatus claimed in claim 1, wherein each of the jet nozzles has a blow out exit having a rectifier grid.

4. A laser welding apparatus as claimed in claim 2, wherein each of the jet nozzles has a blow out exit having a rectifier grid.

5. A laser welding apparatus as claimed in claim 1, wherein each of the jet nozzles is set to a blow out direction at an intersecting angle of 70 to 90 degrees with respect to a welding laser beam emission direction.

6. A laser welding apparatus as claimed in claim 5, the apparatus further comprising a jet direction adjustment mechanism for adjusting the intersecting angle defined by the welding laser beam emission direction and the jet nozzle blow out direction.

7. A laser welding apparatus as claimed in claim 6, further comprising a laser support mechanism for supporting the laser output mechanism and moving the laser output mechanism in a longitudinal direction toward or away from the object to be welded,
    wherein the jet direction adjustment mechanism moves the jet nozzles along the longitudinal direction.

8. A laser welding apparatus as claimed in claim 1, further comprising an optical system protection mechanism for forming a film-shaped air curtain between a laser oscillator and the output end.

9. A laser welding apparatus as claimed in claim 1, wherein the shield gas includes at least one of argon gas, nitrogen gas, and helium gas.

10. A laser welding apparatus comprising:
    a laser output mechanism for applying a welding laser beam to a welding position of an object to be welded; and
    a plurality of jet nozzles each for providing a shield gas to the welding position for preventing oxidation of the welding position, wherein the plurality of jet nozzles are symmetrically arranged about said welding position.

11. A laser welding apparatus as claimed in claim 10, wherein the plurality of jet nozzles comprises three jet nozzles.

12. A laser welding apparatus as claimed in claim 11, wherein each of the jet nozzles has a blow out exit having a rectifier grid.

13. A laser welding apparatus as claimed in claim 10, wherein each of the jet nozzles has a blow out exit having a rectifier grid.

14. A laser welding apparatus as claimed in claim 10, wherein each of the jet nozzles is set to a blow out direction at an intersecting angle of 70 to 90 degrees with respect to a welding laser beam emission direction.

15. A laser welding apparatus as claimed in claim 14, further comprising a jet direction adjustment mechanism for adjusting the intersecting angle defined by the welding laser beam emission direction and the jet nozzle blow out direction.

16. A laser welding apparatus as claimed in claim 15, further comprising a laser support mechanism for supporting the laser output mechanism and moving the laser output mechanism in a longitudinal direction toward or away from the object to be welded,
    wherein the jet direction adjustment mechanism moves the jet nozzles along the longitudinal direction.

17. A laser welding apparatus as claimed in claim 10, further comprising an optical system protection mechanism for forming a film-shaped air curtain between a laser oscillator and an output end of said laser output mechanism.

18. A laser welding apparatus as claimed in claim 10, wherein the shield gas includes at least one of argon gas, nitrogen gas, and helium gas.

* * * * *